United States Patent
Sugimoto (10) Patent No.: US 9,211,853 B2
(45) Date of Patent: Dec. 15, 2015

(54) OUTER PROTECTIVE TUBE FOR ELECTRIC WIRE

(71) Applicant: Yazaki Corporation, Minato-ku, Tokyo (JP)

(72) Inventor: Masahisa Sugimoto, Susono (JP)

(73) Assignee: Yazaki Corporation, Minato-ku, Tokyo (JP)

(\*) Notice: Subject to any disclaimer, the term of this patent is extended or adjusted under 35 U.S.C. 154(b) by 0 days.

(21) Appl. No.: 14/718,711

(22) Filed: May 21, 2015

(65) Prior Publication Data

US 2015/0251609 A1    Sep. 10, 2015

Related U.S. Application Data

(63) Continuation of application No. PCT/JP2013/081397, filed on Nov. 21, 2013.

(30) Foreign Application Priority Data

Nov. 21, 2012 (JP) ................. 2012-255284

(51) Int. Cl.
*H02G 3/04* (2006.01)
*B60R 16/02* (2006.01)
(Continued)

(52) U.S. Cl.
CPC .............. *B60R 16/0215* (2013.01); *H01B 3/30* (2013.01); *H02G 3/0468* (2013.01); *H02G 3/0475* (2013.01); *H02G 3/0487* (2013.01); *H02G 3/263* (2013.01); *H02G 3/32* (2013.01)

(58) Field of Classification Search
CPC ............. H02G 3/04; H02G 3/30; H02G 3/32; H02G 3/0468; H02G 3/0475; H02G 3/263; H02G 3/0487; B60R 16/02; B60R 16/0215

USPC ........ 174/72 R, 72 A, 68.1, 68.3, 70 C, 72 C, 174/88 R, 95; 248/68.1, 49
See application file for complete search history.

(56) References Cited

U.S. PATENT DOCUMENTS 4,248,459 A \* 2/1981 Pate ..................... H02G 3/0468
174/72 R
6,717,055 B2 \* 4/2004 Kato ....................... H02G 3/32
174/72 A (Continued)

FOREIGN PATENT DOCUMENTS

| JP | 2004-224156 A | 8/2004 |
|---|---|---|
| JP | 2009-143326 A | 7/2009 |
| JP | 2010-133543 A | 6/2010 |

OTHER PUBLICATIONS

Dec. 24, 2013—International Search Report—Intl App PCT/JP2013/081397.

(Continued)

*Primary Examiner* — Angel R Estrada
(74) *Attorney, Agent, or Firm* — Banner & Witcoff, Ltd.

(57) ABSTRACT

At least one section of non-bendable straight tube portion includes longitudinal movement restriction protrusions which are provided to protrude from an outer peripheral surface of the non-bendable straight tube portion and are provided with an interval which is equal to a width of a fixing member. In addition, the non-bendable straight tube portion further includes a peripheral movement restriction protrusion provided to protrude from the outer peripheral surface to linearly extend from one end to the other end of the non-bendable straight tube portion along the longitudinal direction of the non-bendable straight tube portion in order to restrict movement of the fixing member in a peripheral direction with respect to the non-bendable straight tube portion.

3 Claims, 9 Drawing Sheets (51) Int. Cl.
*H02G 3/32* (2006.01)
*H02G 3/00* (2006.01)
*H01B 3/30* (2006.01)

(56) References Cited

U.S. PATENT DOCUMENTS

| | | | |
|---|---|---|---|
| 7,053,304 B2* | 5/2006 | Ojima | B60R 16/0215 174/72 A |
| 7,563,981 B2* | 7/2009 | Ichikawa | B60R 16/0215 174/72 A |
| 8,020,812 B2 | 9/2011 | Matsuno et al. | |
| 8,648,259 B2* | 2/2014 | Gniewek | H02G 3/0468 174/650 |
| 2005/0011687 A1 | 1/2005 | Yamaguchi et al. | |
| 2010/0148015 A1 | 6/2010 | Matsuno et al. | |

OTHER PUBLICATIONS

Jun. 4, 2015—(PCT) International Preliminary Report on Patentability—App PCT/JP2013/081397.

* cited by examiner

OUTER PROTECTIVE TUBE FOR ELECTRIC WIRE

CROSS REFERENCE TO RELATED APPLICATIONS

This application is a continuation of PCT application No. PCT/JP2013/081397, which was filed on Nov. 21, 2013 based on Japanese Patent Application (No. 2012-255284) filed on Nov. 21, 2012, the contents of which are incorporated herein by reference.

BACKGROUND OF THE INVENTION

1. Field of the Invention

One or more embodiments of the present invention relate to an outer protective tube for an electric wire which accommodates an electric wire for protection.

2. Description of the Related Art

An outer protective tube for an electric wire which accommodates an electric wire has been used in a wire harness which is arranged in the vehicle body or the like of a vehicle. In order to apply the wire harness to a three-dimensional arrangement path, the wire harness includes a bendable tube portion which is a bendable portion and a non-bendable straight tube portion which is a portion (in other words, a portion which is less likely to bend) held in a straight tube shape (refer to below Patent document 1).

In addition, fixing members (refer to below Patent document 2) for fixing are mounted to a plurality of positions of the outer protective tube for the electric wire along the longitudinal direction thereof. As the fixing members are fixed to stud bolts or the like which are provided to protrude from predetermined mounting positions of the vehicle, the outer protective tube for the electric wire is fixed to the vehicle body on a predetermined arrangement path.

Patent document 1 is JP-A-2009-143326 and Patent document 2 is JP-A-2010-133543.

SUMMARY OF THE INVENTION

However, the outer peripheral surface of the non-bendable straight tube portion is not provided with a hooking portion, and thus the outer protective tube for the electric wire of the related art cannot be easily fixed by the fixing members. In this case, it is considered that portions on the outer peripheral surface of the non-bendable straight tube portion on which the fixing members are to be mounted are provided with protrusions or the like and thus the fixing members are easily fixed to the non-bendable straight tube portion. However, when the protrusions or the like are partially provided in the non-bendable straight tube portion, variations occur in the stiffness of the tube.

One or more embodiments of the present invention have been made taking the foregoing circumstances into consideration, and an object thereof is to provide an outer protective tube for an electric wire in which the stiffness of a non-bendable straight tube portion is uniformly increased in the peripheral direction and the longitudinal direction thereof and a fixing member is easily fixed.

In order to accomplish the above-described object, the outer protective tube for the electric wire according to the one or more embodiments of the present invention have the following features (1) to (3).

(1) An outer protective tube for an electric wire which is formed of an insulating resin in a tube shape so as to accommodate an electric wire therein and is fixed to a predetermined mounting position by a fixing member, the outer protective tube including: a bendable portion which is a bendable section; and non-bendable straight tube portions each of which is a section held in a straight tube shape, in which, the non-bendable straight tube portions and the bendable portion are alternately connected along a longitudinal direction of the outer protective tube, and a non-bendable straight tube portion of at least one section of the non-bendable straight tube portions includes a plurality of longitudinal movement restriction protrusions which are provided to protrude from an outer peripheral surface of the non-bendable straight tube portion along a peripheral direction of the non-bendable straight tube portion, and are provided along a longitudinal direction of the non-bendable straight tube portion with an interval which is equal to a width of the fixing member in the longitudinal direction of the non-bendable straight tube portion so as to allow the fixing member to be interposed between the longitudinal movement restriction protrusions, and at least one peripheral movement restriction protrusion which is provided to protrude from the outer peripheral surface of the non-bendable straight tube portion to linearly extend from one end to the other end of the non-bendable straight tube portion along the longitudinal direction of the non-bendable straight tube portion in order to restrict movement of the fixing member in the peripheral direction with respect to the non-bendable straight tube portion.

(2) The outer protective tube for the electric wire described in (1), in which, in the non-bendable straight tube portion, at least a pair of longitudinal movement restriction protrusions among the plurality of longitudinal movement restriction protrusions are provided with an interval in which the fixing member slidably moves in the longitudinal direction of the non-bendable straight tube portion.

(3) The outer protective tube for the electric wire described in (1), in which, the at least one peripheral movement restriction protrusion includes a plurality of peripheral movement restriction protrusions, and the plurality of peripheral movement restriction protrusions are disposed at a plurality of positions evenly dispersed along the peripheral direction of the non-bendable straight tube portion.

According to the outer protective tube for the electric wire of (1), since a plurality of portions which are increased in thickness in the peripheral direction by the longitudinal movement restriction protrusions are provided along the longitudinal direction of the non-bendable straight tube portion, the stiffness of the non-bendable straight tube portion can be uniformly increased in the peripheral direction and the longitudinal direction. In addition, since the portion which is increased in thickness by the peripheral movement restriction protrusion is provided to linearly extend from one end to the other end of the non-bendable straight tube portion, the stiffness of the non-bendable straight tube portion can be uniformly increased over the entire region of the non-bendable straight tube portion in the longitudinal direction including a section between the adjacent longitudinal movement restriction protrusions. Furthermore, the movement of the fixing member in the longitudinal direction and the peripheral direction of the non-bendable straight tube portion is restricted by the longitudinal movement restriction protrusions and the peripheral movement restriction protrusion. For this reason, according to the outer protective tube for the electric wire of (1), the stiffness of the non-bendable straight tube portion can be uniformly increased in the peripheral direction and the longitudinal direction, and the fixing member is easily fixed.

In the outer protective tube for the electric wire of (2), at least a pair of longitudinal movement restriction protrusions are provided with an interval in which the fixing member slidably moves in the longitudinal direction of the non-bendable straight tube portion. Therefore, even in a case where, due to the dimensional tolerance of the outer protective tube for the electric wire or the dimensional tolerance of the mounting position of the outer protective tube for the electric wire, a deviation occurs between the fixing member which is mounted on the outer protective tube for the electric wire and the mounting position of the fixing member in which a stud bolt or the like is provided in advance, the fixing member can be adjusted to be disposed at the mounting position while being slidably moved in the longitudinal direction of the non-bendable straight tube portion.

In addition, according to the outer protective tube for the electric wire of (3), since the peripheral movement restriction protrusions are provided to be disposed to be evenly dispersed in the peripheral direction of the non-bendable straight tube portion, the stiffness of the non-bendable straight tube portion in the peripheral direction can be uniformly increased.

BRIEF DESCRIPTION OF THE DRAWINGS

FIGS. 4A and 4B are front views of a fixing member illustrated in FIG. 1, in which FIG. 4A illustrates a state where a movable interposing portion and a fixed interposing portion are not engaged with each other, and FIG. 4B illustrates a state where the movable interposing portion and the fixed interposing portion are engaged with each other.

FIGS. 5A and 5B are perspective views of the fixing member illustrated in FIG. 1, in which FIG. 5A is a view when viewed from above, and FIG. 5B is a view when viewed from below.

DETAILED DESCRIPTION OF THE EXEMPLARY EMBODIMENTS

Hereinafter, exemplary embodiments of an outer protective tube for an electric wire according to the present invention will be described in detail with reference to the drawings.

Figure 1:
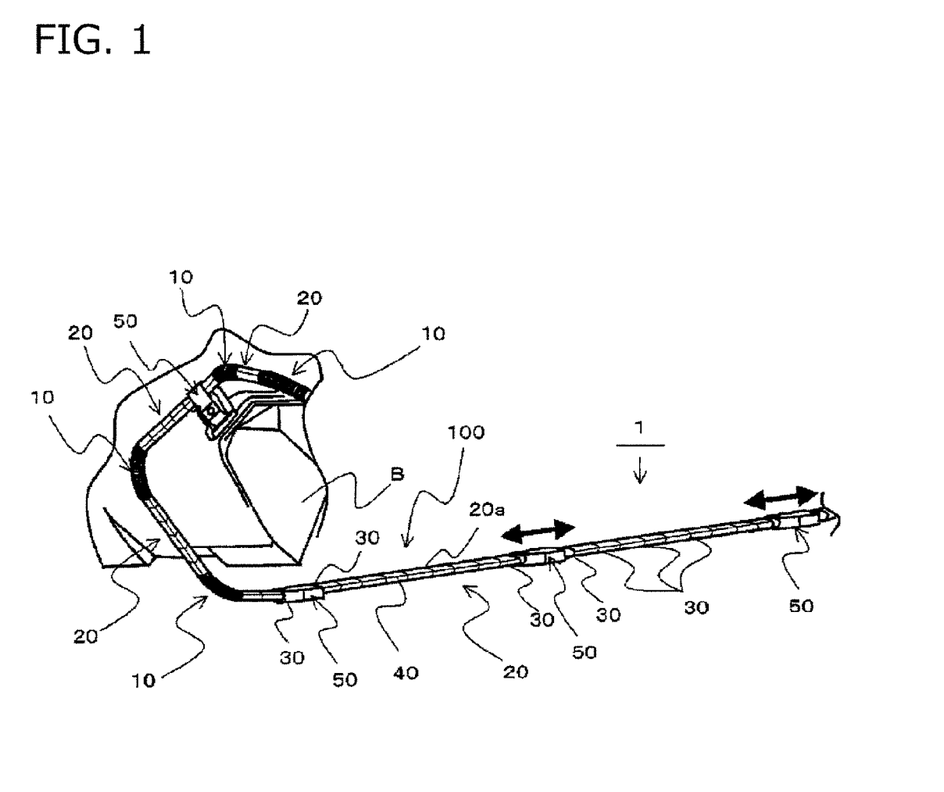
FIG. 1 is a view illustrating a state where a wire harness which uses an outer protective tube for an electric wire according to an embodiment is arranged in a vehicle body.
Figure 2:
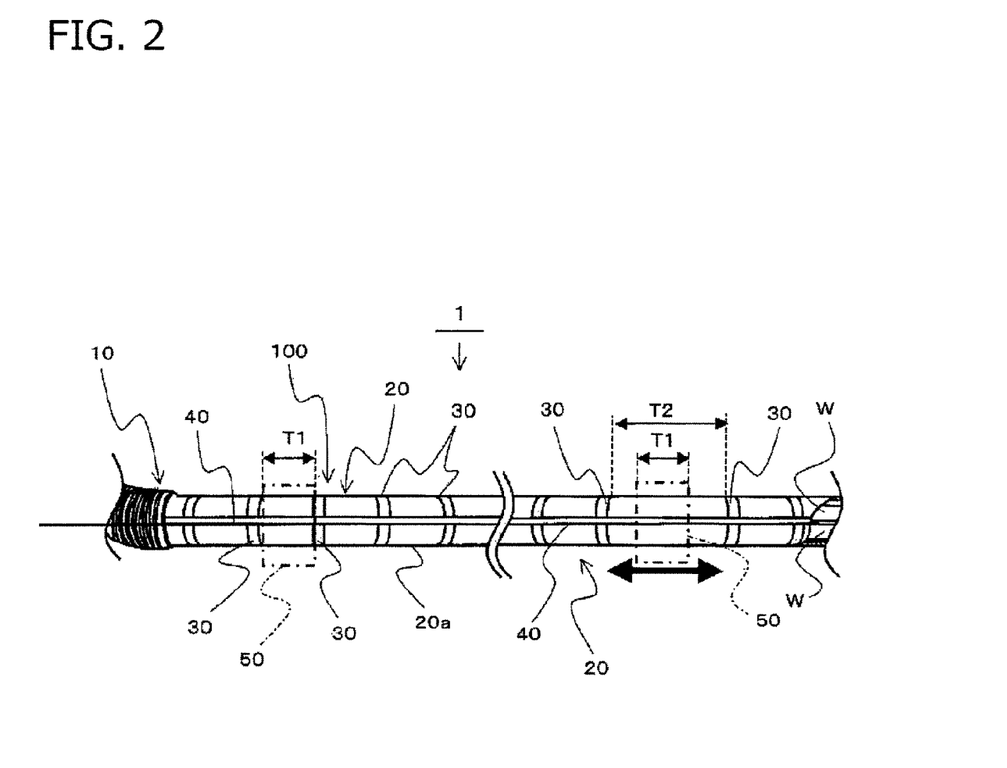
FIG. 2 is an enlarged view of a main part of the outer protective tube for the electric wire illustrated in FIG. 1.
Figure 3:
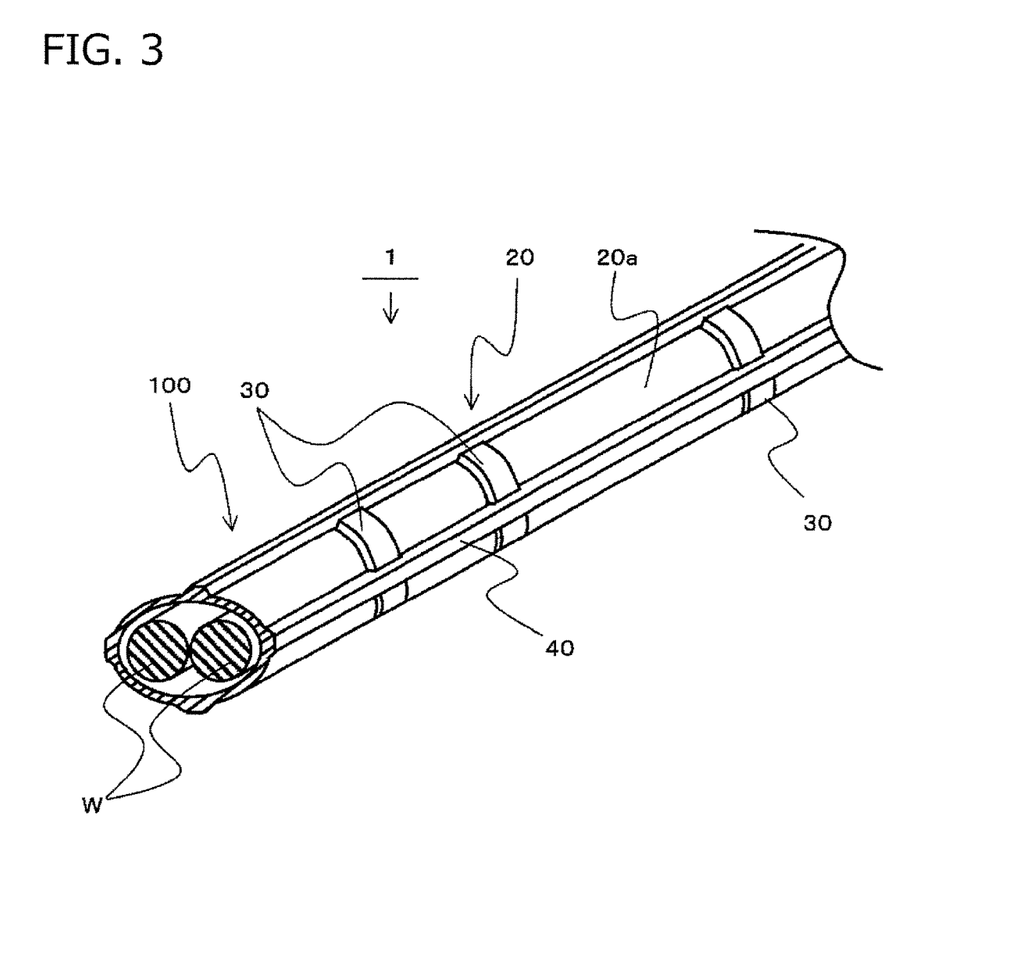
FIG. 3 is a perspective view illustrating a part of the wire harness illustrated in FIG. 1 and a cross-section thereof.
Figure 4A:
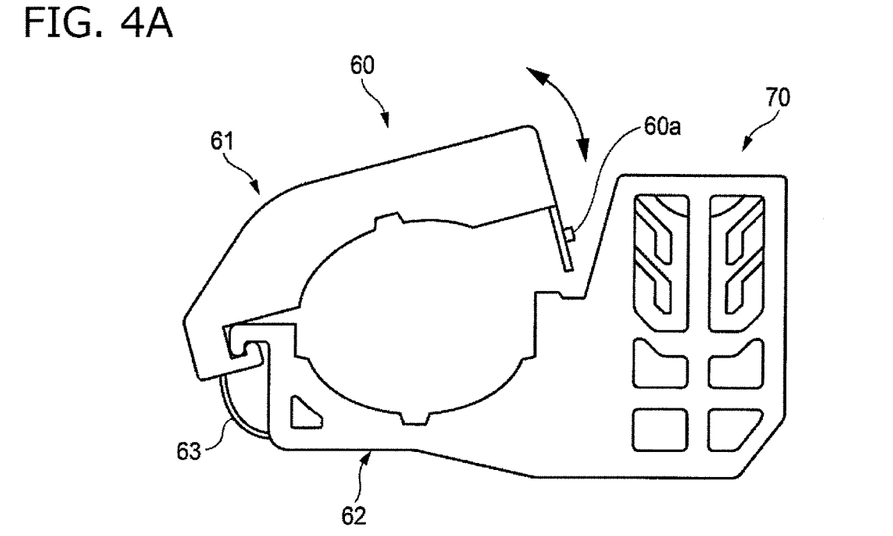
Figure 4B:
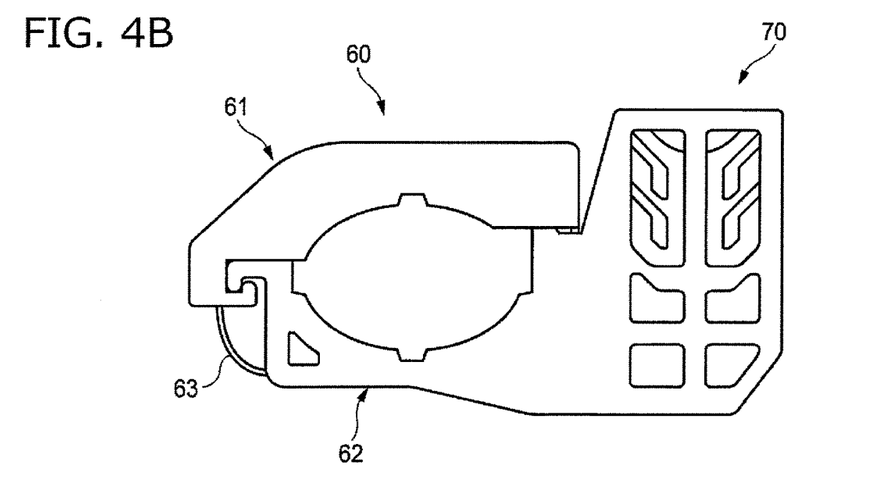
Figure 5A:
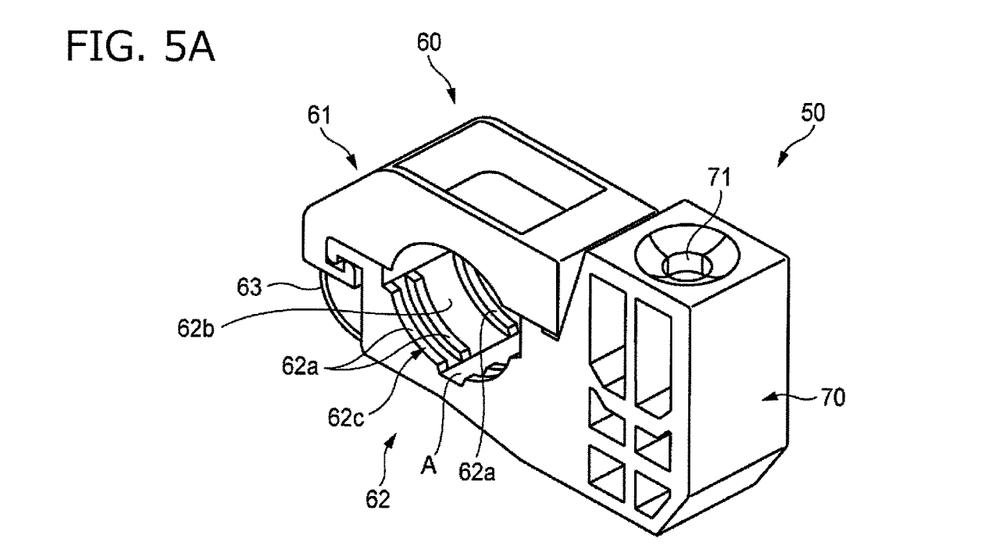
Figure 5B:
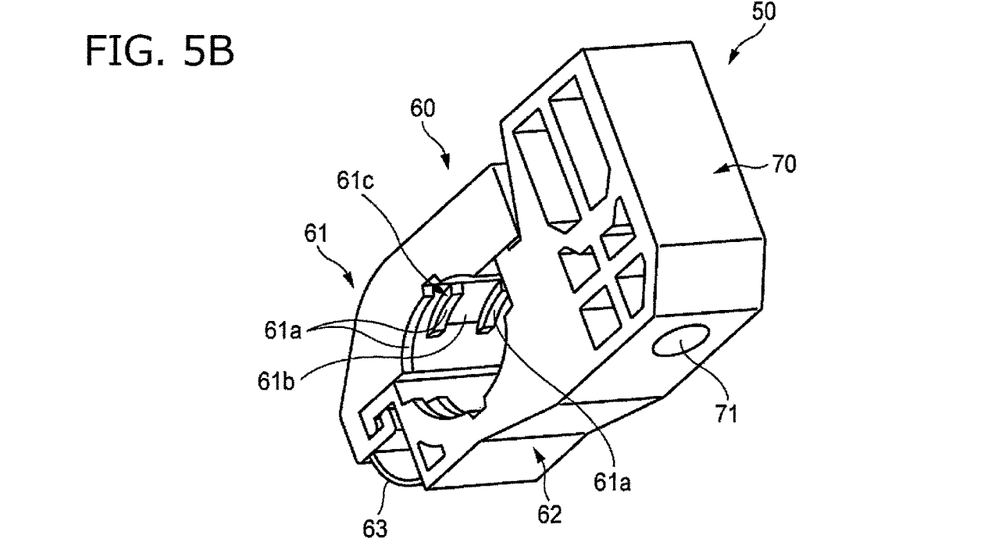
Figure 6:
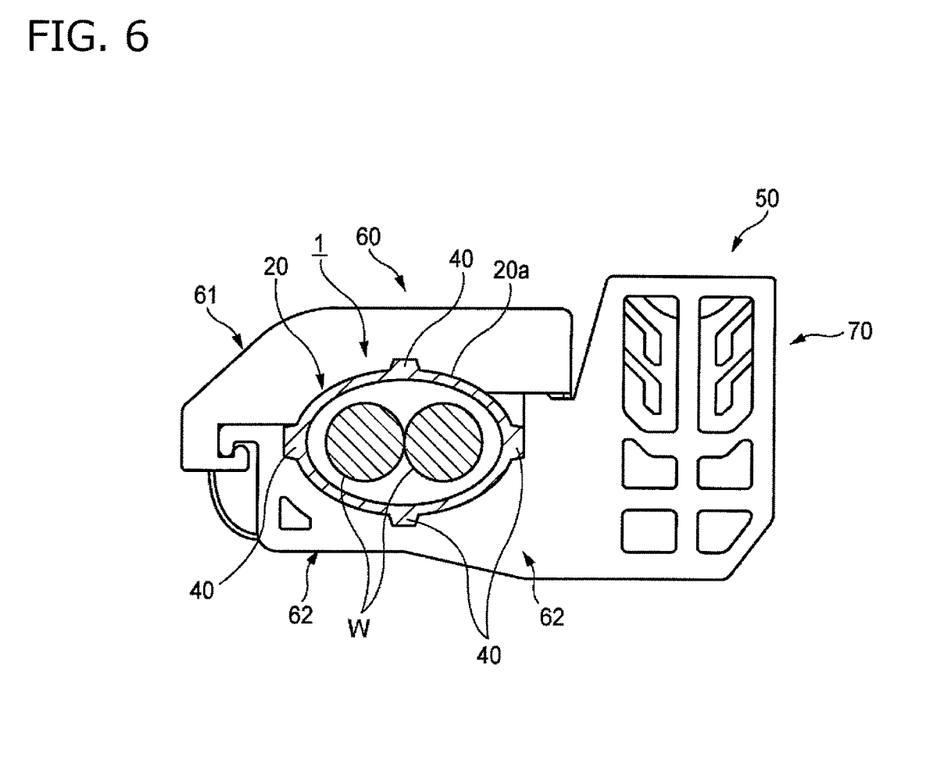
FIG. 6 is a view illustrating a state where the fixing member is mounted on the outer protective tube for the electric wire.

FIG. 1 is a view illustrating a state where a wire harness 100 which uses an outer protective tube 1 for an electric wire according to the embodiment of the present invention is arranged in a vehicle body B. FIG. 2 is an enlarged view of a main part of the outer protective tube 1 for the electric wire illustrated in FIG. 1. FIG. 3 is a perspective view illustrating a part of the wire harness 100 illustrated in FIG. 1 and a cross-section thereof. FIG. 4A and FIG. 4B are front views of a fixing member 50 illustrated in FIG. 1, in which FIG. 4A illustrates a state where a movable interposing portion 61 and a fixed interposing portion 62 are not engaged with each other, and FIG. 4B illustrates a state where the movable interposing portion 61 and the fixed interposing portion 62 are engaged with each other. FIGS. 5A and 5B are perspective views of the fixing member 50 illustrated in FIG. 1, in which FIG. 5A is a view when viewed from above, and FIG. 5B is a view when viewed from below. FIG. 6 is a view illustrating a state where the fixing member 50 is mounted on the outer protective tube 1 for the electric wire. In addition, in FIG. 6, the cross-sectional view of the wire harness 100 is illustrated.

The outer protective tube 1 for the electric wire according to this embodiment is a member which is used in the so-called wire harness 100 that is arranged in the vehicle body B of a vehicle, and accommodates electric wires W for protection. The outer protective tube 1 for an electric wire is a tubular member made of an insulating resin, in which the electric wires W are accommodated. In the outer protective tube 1 for the electric wire, along the longitudinal direction, bendable portions 10 which are bendable sections and non-bendable straight tube portions 20 which are sections held in a straight tube shape are alternately connected. The outer protective tube 1 for an electric wire is fixed to a predetermined mounting position of the vehicle body B by the fixing member 50.

In the outer protective tube 1 for the electric wire of this embodiment, as illustrated in FIG. 3, two electric wires W respectively corresponding to two systems called "plus" and "minus" are bound together and are accommodated in the tube of which the outer shape of the cross-section is elliptical, that is, flat. The electric wires W are high-voltage electric wires which electrically connect a battery (not illustrated) to an inverter (not illustrated), and the two electric wires are covered with a shielding member (not illustrated) made of a metallic foil or the like so as to have a shielding function on the electric wire side.

In addition, the number of electric wires W which are accommodated in the outer protective tube 1 for an electric wire is not limited to two, and may be another number as long as the number is one or more.

As illustrated in FIG. 1, the outer protective tube 1 for the electric wire described above includes the bendable portions 10 which are divided into four sections along the longitudinal direction and the non-bendable straight tube portions 20 which are divided into four sections. In the outer protective tube 1 for the electric wire of this embodiment, the fixing members 50 are mounted on the two sections of the non-bendable straight tube portions 20. More specifically, in the outer protective tube 1 for the electric wire, among the two sections of the non-bendable straight tube portions 20 on which the fixing members 50 are mounted, one fixing member 50 is mounted on one non-bendable straight tube portion 20, and the three fixing members 50 are mounted on the other non-bendable straight tube portion 20 which is long.

The bendable portions 10 are portions which have so-called bellows shapes and are bent according to the arrangement path of the wire harness 100.

In addition, the bendable portion 10 may also be fixed to the vehicle body B by a fixing member (not illustrated) which is different from the fixing member 50.

In addition, the bendable portion 10 is not limited to the bellows shape, and may also have another shape as long as the shape is bendable. For example, the bendable portion 10 may be bent by adjusting the thickness of the tube.

The non-bendable straight tube portions 20 are portions which are provided to correspond to linear arrangement paths of the arrangement path of the wire harness 100. Particularly, in the wire harness 100 arranged in the vehicle body B, there is a tendency for the length of the non-bendable straight tube portion 20 which is arranged beneath the floor to be set to be relatively long. Therefore, a plurality of fixing members 50 are mounted on the long non-bendable straight tube portion 20.

The non-bendable straight tube portion 20 includes longitudinal movement restriction protrusions 30 and peripheral movement restriction protrusions 40.

The longitudinal movement restriction protrusions 30 are provided to protrude from the outer peripheral surface of the non-bendable straight tube portion 20 along the peripheral direction thereof. In addition, the longitudinal movement restriction protrusions 30 are continuously provided along the longitudinal direction of the non-bendable straight tube portion 20 with an interval therebetween which is equal to the width of the fixing member 50 in the longitudinal direction of the non-bendable straight tube portion 20 so as to allow the fixing member 50 to be interposed therebetween.

More specifically, as illustrated in FIG. 2, in the longitudinal movement restriction protrusions 30, the interval between the longitudinal movement restriction protrusions 30 is set to be equal to a width T1 of an interposing portion 60 of the fixing member 50, which will be described later.

In addition, each of the longitudinal movement restriction protrusions 30 is formed in an annular shape along the outer peripheral direction of the non-bendable straight tube portion 20. Accordingly, the surface which comes into contact with the fixing member 50 is continuously formed along the outer peripheral direction of the non-bendable straight tube portion 20, and thus the fixing member 50 is stably fixed by the longitudinal movement restriction protrusions 30.

In addition, the portions which are increased in thickness in the peripheral direction by the longitudinal movement restriction protrusions 30 are continuously provided along the longitudinal direction of the non-bendable straight tube portion 20, and thus the stiffness of the non-bendable straight tube portion 20 can be uniformly increased in the peripheral direction and the longitudinal direction.

The peripheral movement restriction protrusions 40 are provided to protrude from the outer peripheral surface of the non-bendable straight tube portion 20 to linearly extend from one end to the other end of the non-bendable straight tube portion 20 along the longitudinal direction of the non-bendable straight tube portion 20 in order to restrict the movement of the fixing member 50 in the peripheral direction with respect to the non-bendable straight tube portion 20.

The peripheral movement restriction protrusions 40 are disposed at four positions along the peripheral direction so as to be disposed to be evenly dispersed along the peripheral direction of the non-bendable straight tube portion 20.

Each of the peripheral movement restriction protrusions 40 is inserted between protrusions 61*c* and 62*c* of the fixing member 50, which will be described later, and thus has a function of restricting the rotation of the fixing member 50 in the peripheral direction with respect to the non-bendable straight tube portion 20.

In addition, the portions which are increased in thickness by the peripheral movement restriction protrusions 40 are provided to linearly extend from one end to the other end of the non-bendable straight tube portion 20, and thus the stiffness of the non-bendable straight tube portion 20 can be uniformly increased over the entire region of the non-bendable straight tube portion 20 in the longitudinal direction including the sections between the adjacent longitudinal movement restriction protrusions 30. Furthermore, the peripheral movement restriction protrusions 40 are disposed to be evenly dispersed in the peripheral direction of the non-bendable straight tube portion 20, and thus the stiffness of the non-bendable straight tube portion 20 in the peripheral direction can be uniformly increased.

In addition, in this embodiment, in one section of the non-bendable straight tube portions 20 which are disposed beneath the floor of the vehicle body B, two pairs of longitudinal movement restriction protrusions 30 are provided with an interval in which the fixing member 50 slidably moves in the longitudinal direction of the non-bendable straight tube portion 20.

Accordingly, even in a case where, due to the dimensional tolerance of the outer protective tube 1 for the electric wire or the dimensional tolerance of the vehicle body B which is provided with a mounting position of the outer protective tube 1 for the electric wire, a deviation occurs between the fixing member 50 which is mounted on the outer protective tube 1 for an electric wire and the mounting position of the fixing member 50 in the vehicle body B in which a stud bolt or the like is provided in advance, the fixing member 50 can be adjusted to be disposed at the mounting position of the vehicle body B while being slidably moved in the longitudinal direction of the non-bendable straight tube portion 20.

More specifically, as illustrated in FIG. 2, the interval T2 between the longitudinal movement restriction protrusions 30 which form a pair is set to be larger than the width T1 of the interposing portion 60 of the fixing member 50, which will be described later. Therefore, the fixing member slidably moves between the longitudinal movement restriction protrusions 30 and abuts the longitudinal movement restriction protrusions 30 such that the movement range of the fixing member is restricted.

In addition, the mounting position of the fixing member 50 on the non-bendable straight tube portion 20 may be clearly shown by using an indication used in the outer protective tube 1 for the electric wire such as an indication which indicates the material of the outer protective tube 1 for the electric wire and disposing the indication at the mounting position of the fixing member 50.

Hereinafter, the fixing member 50 will be described in detail.

As illustrated in FIGS. 4A to 5B, the fixing member 50 includes the interposing portion 60 which fixes the non-bendable straight tube portion 20 thereto by allowing the non-bendable straight tube portion 20 to be interposed, and a mounting fixing portion 70 which is fixed to a predetermined mounting position of the vehicle body B.

The interposing portion 60 includes the movable interposing portion 61, the fixed interposing portion 62, and a connection portion 63 which can be flexibly deformed so as to connect the movable interposing portion 61 and the fixed interposing portion 62. The non-bendable straight tube portion 20 is interposed between the movable interposing portion 61 and the fixed interposing portion 62 by folding back the movable interposing portion 61 toward the fixed interposing portion 62 via the connection portion 63.

In addition, the interposing portion 60 is locked in a state of allowing the non-bendable straight tube portion 20 to be interposed, by engaging an engaging portion 60*a* which is provided in the end portion of the movable interposing portion 61 on the opposite side to the connection portion 63 with an engaged portion (not illustrated) which is provided in the fixed interposing portion 62.

In addition, as illustrated in FIGS. 5A and 5B, the movable interposing portion 61 and the fixed interposing portion 62 respectively include non-bendable straight tube portion contact surface portions 61*a* and 62*a* which are surfaces that come into contact with an outer peripheral surface 20*a* of the non-bendable straight tube portion 20 which is interposed in the interposing portion 60 in the engaged state.

The non-bendable straight tube portion contact surface portions 61a and 62a are formed in curved surface shapes corresponding to the shape of the outer peripheral surface 20a of the non-bendable straight tube portion 20. More specifically, the non-bendable straight tube portion contact surface portions 61a and 62a are formed on the upper end edge surfaces of the protrusions 61c and 62c which protrude from non-bendable straight tube portion opposing surfaces 61b and 62b that oppose (face) the outer peripheral surface 20a of the non-bendable straight tube portion 20.

The protrusions 61c and 62c are provided at a plurality of positions of the non-bendable straight tube portion opposing surfaces 61b and 62b so as to form gaps A of the width of the peripheral movement restriction protrusion 40 such that the peripheral movement restriction protrusions 40 of the non-bendable straight tube portion 20 are fitted between the protrusions 61c and 62c.

In addition, in this embodiment, the protrusions 61c and 62c which are provided in the fixing member 50 are exemplified. However, the present invention is not limited thereto, and instead of providing the protrusions 61c and 62c, the non-bendable straight tube portion opposing surfaces 61b and 62b may come into contact with the outer peripheral surface 20a of the non-bendable straight tube portion 20 and the peripheral movement restriction protrusions 40 may be fitted into grooves which are formed in the non-bendable straight tube portion opposing surfaces 61b and 62b.

The mounting fixing portion 70 includes a bolt insertion hole 71 into which a stud bolt (not illustrated) that is provided to protrude from a predetermined mounting position of the vehicle body B. The fixing member 50 is fixed to a predetermined mounting position of the vehicle body B by inserting the stud bolt (not illustrated) into the bolt insertion hole 71. In addition, the mounting fixing portion 70 may also have another structure which does not include the bolt insertion hole 71 as long as the structure can be fixed to a predetermined mounting position.

The width of the interposing portion 60 of the fixing member 50 is equal to the interval between the longitudinal movement restriction protrusions 30 which are continuously provided along the longitudinal direction of the non-bendable straight tube portion 20. Therefore, the fixing member 50 can be mounted on the non-bendable straight tube portion 20 to be fixed thereto by disposing the interposing portion 60 between the longitudinal movement restriction protrusions 30. That is, the fixing member 50 is fixed to the non-bendable straight tube portion 20.

In addition, in this embodiment, the two fixing members 50 are slidably mounted on the non-bendable straight tube portion 20 respectively between the two pairs of longitudinal movement restriction protrusions 30 which are disposed with an interval that is larger than the width of the interposing portion 60.

In addition, the fixing member 50 is mounted in a state where the rotation thereof in the peripheral direction of the non-bendable straight tube portion 20 is restricted by fitting the peripheral movement restriction protrusion 40 of the non-bendable straight tube portion 20 into the gap A formed between the protrusions 61c and 62c.

Next, an example of the arrangement order of the wire harness 100 which uses the outer protective tube 1 for the electric wire will be described with reference to FIGS. 7A to 8B. FIGS. 7A to 8B are views illustrating the example of the arrangement order of the wire harness 100 which uses the outer protective tube 1 for the electric wire.

Figure 7A:
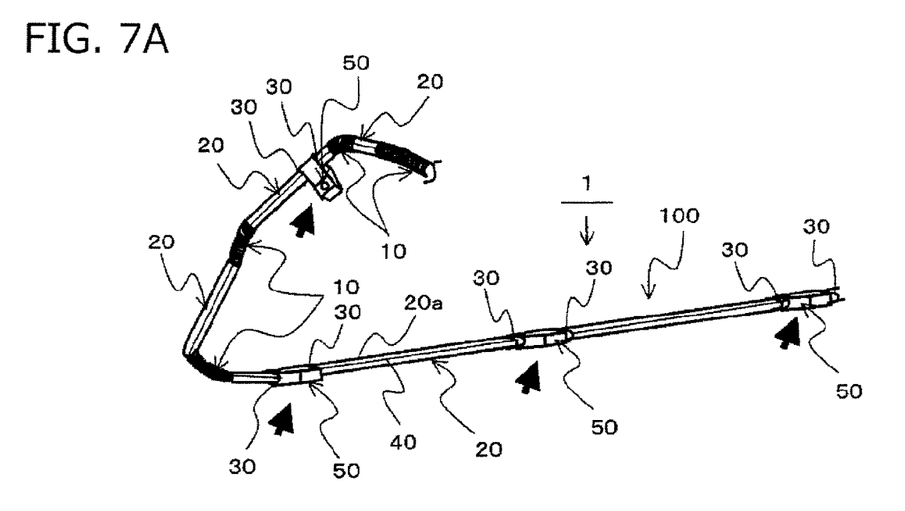
FIGS. 7A and 7B are views illustrating an example of the arrangement order of the wire harness which uses the outer protective tube for the electric wire.

First, an operator mounts the four fixing members 50 on predetermined sections of the non-bendable straight tube portions 20 (see FIG. 7A). In addition, in this embodiment, among the four sections of the non-bendable straight tube portions 20, the fixing members 50 are mounted on the two sections of the non-bendable straight tube portions 20, and particularly, the three fixing members 50 are mounted on the long non-bendable straight tube portion 20 which is disposed beneath the floor of the vehicle.

More specifically, one fixing member 50 is disposed to be fixed to the long non-bendable straight tube portion 20 in the vicinity of the bendable portion 10, and the other two fixing members 50 are slidably mounted on the non-bendable straight tube portion 20. On the other hand, one fixing member 50 is disposed to be fixed to the remaining one section of the non-bendable straight tube portion 20 in the vicinity of the bendable portion 10.

Each of the fixing members 50 is positioned between the longitudinal movement restriction protrusions 30 and is mounted on the non-bendable straight tube portion 20 so that the peripheral movement restriction protrusions 40 of the non-bendable straight tube portion 20 are inserted into the gaps A formed between the protrusions 61c and 62c. Therefore, the longitudinal movement restriction protrusions 30 and the peripheral movement restriction protrusions 40 have a function of positioning the fixing members 50 on the non-bendable straight tube portion 20.

As described above, among the four fixing members 50 mounted on the non-bendable straight tube portions 20, the movement of the two fixing members 50 in the longitudinal direction and the peripheral direction of the non-bendable straight tube portions 20 are restricted and thus the two fixing members 50 are stably fixed to the non-bendable straight tube portions 20 without backlash. In addition, the remaining two fixing members 50 are slidably mounted on the non-bendable straight tube portion 20 in a state where the rotation thereof in the peripheral direction is restricted by the peripheral movement restriction protrusion 40.

Figure 7B:
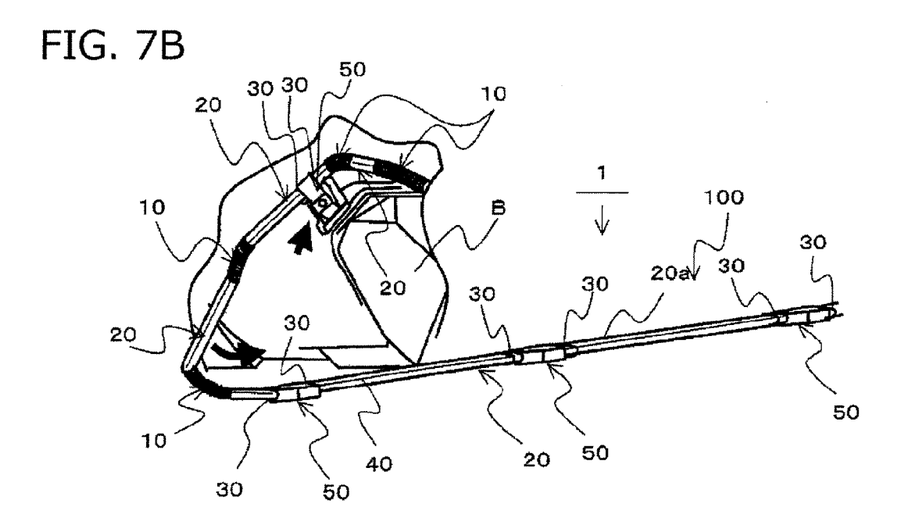

Thereafter, the operator fixes the first fixing member 50 which is disposed to be fixed to one section of the non-bendable straight tube portions 20 to a predetermined mounting position of the vehicle body B (see FIG. 7B). In a state before this operation, the fixing member 50 is not fixed to any of mounting positions of the vehicle body B yet, and thus the fixing member 50 can be fixed to the mounting position of the vehicle body B regardless of the dimensional tolerance.

Figure 8A:
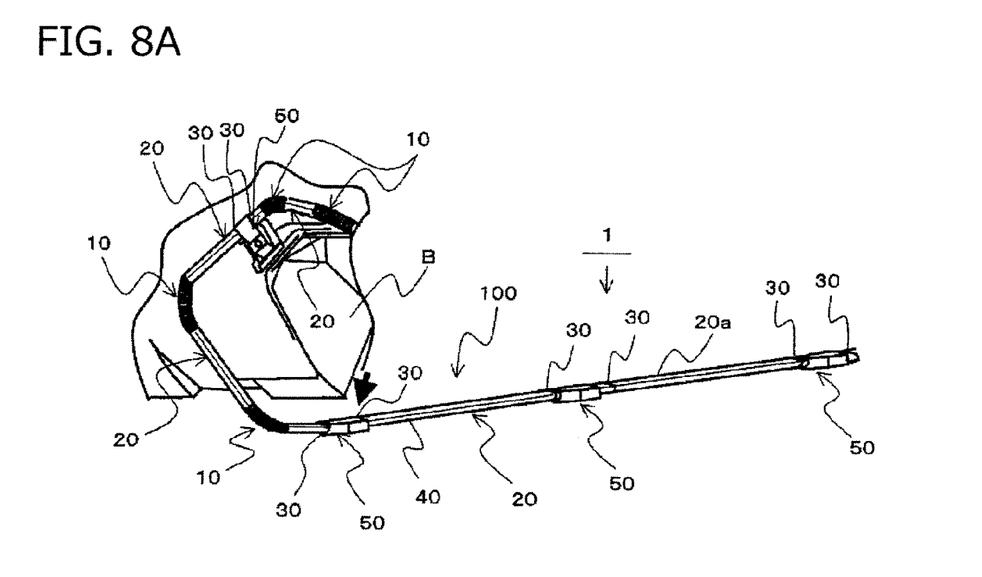
FIGS. 8A and 8B are views illustrating the example of the arrangement order of the wire harness which uses the outer protective tube for the electric wire, and are views which follow FIG. 7B.

Thereafter, the operator bends the outer protective tube 1 for the electric wire, of which one position is fixed to mounting predetermined position by the first fixing member 50, along the arrangement path, and fixes the second fixing member 50 which is disposed to be fixed to the long non-bendable straight tube portion 20 which is a different section from the non-bendable straight tube portion 20 fixed in advance, to a mounting position of the vehicle body B (see FIG. 8A). In this operation, the fixing member 50 can be fixed to the predetermined mounting position while adjusting the position of the fixing member 50 by bending the bendable portions 10 between the fixing member 50 and the initially fixed fixing member 50.

Figure 8B:
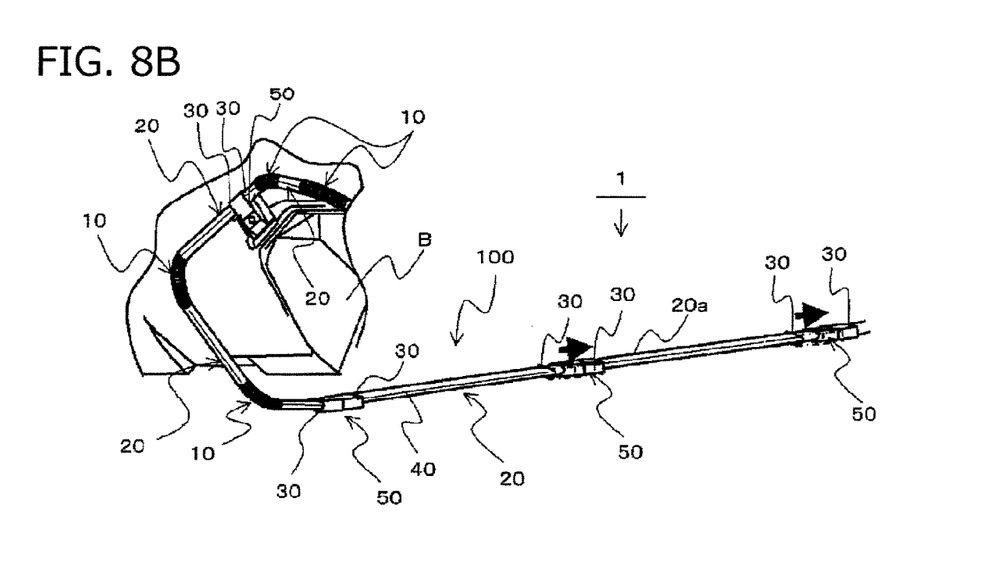

Finally, the operator respectively fixes the remaining two fixing members 50 which are slidably mounted on the long non-bendable straight tube portion 20 to mounting positions of the vehicle body B, thereby finishing the arrangement operation (see FIG. 8B). In a case where the two fixing members 50 are fixed to the mounting positions of the vehicle body B, since one position of the non-bendable straight tube portions 20 is fixed by the fixing member 50, the fixing members 50 are respectively disposed at the mounting position while being slidably moved so as to absorb the dimensional tolerance of the outer protective tube 1 for the electric wire or the mounting positions of the outer protective tube 1 for the electric wire.

In the outer protective tube 1 for the electric wire according to this embodiment, since the portions which are increased in thickness in the peripheral direction by the longitudinal movement restriction protrusions 30 are continuously provided along the longitudinal direction of the non-bendable straight tube portion 20, the stiffness of the non-bendable straight tube portion 20 can be uniformly increased in the peripheral direction and the longitudinal direction. In addition, since the portions which are increased in thickness by the peripheral movement restriction protrusions 40 are provided to linearly extend from one end to the other end of the non-bendable straight tube portion 20, the stiffness of the non-bendable straight tube portion 20 can be uniformly increased over the entire region of the non-bendable straight tube portion 20 in the longitudinal direction including the sections between the adjacent longitudinal movement restriction protrusions 30. Furthermore, the movement of the fixing members 50 in the longitudinal direction and the peripheral direction of the non-bendable straight tube portion 20 is restricted by the longitudinal movement restriction protrusions 30 and the peripheral movement restriction protrusions 40. For this reason, according to the outer protective tube 1 for the electric wire, the stiffness of the non-bendable straight tube portion 20 can be uniformly increased in the peripheral direction and the longitudinal direction, and the fixing members 50 are easily fixed.

In addition, in the outer protective tube 1 for the electric wire according to the embodiment, the longitudinal movement restriction protrusions 30 which form a pair are provided with an interval in which the fixing member 50 slidably moves in the longitudinal direction of the non-bendable straight tube portion 20. Therefore, even in a case where, due to the dimensional tolerance of the outer protective tube 1 for an electric wire or the dimensional tolerance of the mounting position of the outer protective tube 1 for an electric wire, a deviation occurs between the fixing member 50 which is mounted on the outer protective tube 1 for an electric wire and the mounting position of the fixing member 50 in which a stud bolt or the like is provided in advance, the fixing member 50 can be adjusted to be disposed at the mounting position while being slidably moved in the longitudinal direction of the non-bendable straight tube portion 20.

In addition, according to the outer protective tube 1 for an electric wire according to the embodiment, since the peripheral movement restriction protrusions 40 are provided to be disposed to be evenly dispersed in the peripheral direction of the non-bendable straight tube portion 20, the stiffness of the non-bendable straight tube portion 20 in the peripheral direction can be uniformly increased.

Modification Example

Figure 9:
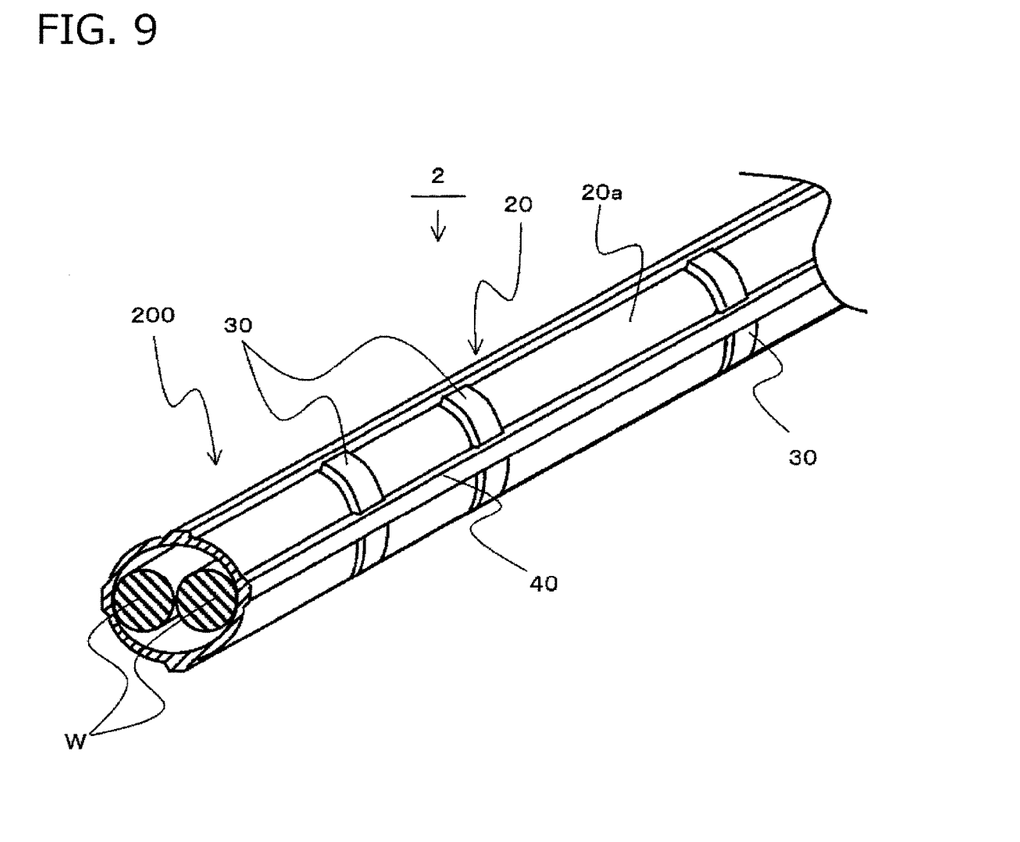
FIG. 9 is a perspective view illustrating a part of a wire harness which uses an outer protective tube for an electric wire of a modification example and a cross-section thereof.

Next, a modification example of the outer protective tube 1 for the electric wire according to the embodiment will be described with reference to FIG. 9. FIG. 9 is a perspective view illustrating a part of a wire harness 200 which uses an outer protective tube 2 for an electric wire of the modification example and the cross-section thereof.

The outer protective tube 2 for the electric wire of the modification example differs from the outer protective tube 1 for the electric wire of the embodiment in that the outer shape of the cross-section is circular.

In addition, the other configurations and uses are the same as those of the outer protective tube 1 for the electric wire of the embodiment, and like elements similar to those of the outer protective tube 1 for the electric wire are denoted by like reference numerals.

The outer protective tube 2 for the electric wire is fixed to a predetermined mounting position by using, instead of the fixing member 50, a fixing member (not illustrated) corresponding to the outer protective tube 2 for the electric wire of which the outer shape of the cross-section is circular. In addition, the fixing member (not illustrated) has the same configuration as that of the fixing member except for the shape thereof which is set to correspond to the outer protective tube 2 for the electric wire, and thus the description thereof will be omitted.

The outer protective tube 2 for the electric wire of this modification example has the same effect as that of the outer protective tube 1 for the electric wire of the embodiment. In addition, since the outer shape of the cross-section is circular, the fixing member (not illustrated) easily rotates in the peripheral direction of the outer protective tube 2 for the electric wire. However, the rotation prevention function of the peripheral movement restriction protrusion 40 is more effectively exhibited.

In addition, the outer protective tubes 1 and 2 for the electric wire according to the embodiment of the present invention are exemplified such that, among the longitudinal movement restriction protrusions 30 which are continuously provided on one section of the non-bendable straight tube portions 20 along the longitudinal direction, the two pairs of longitudinal movement restriction protrusions 30 are provided with an interval in which the fixing member 50 slidably moves in the longitudinal direction of the non-bendable straight tube portion 20. However, the disposition interval between the longitudinal movement restriction protrusions 30 in the longitudinal direction of the non-bendable straight tube portion 20 may be set only to an interval which is equal to the width of the fixing member 50.

In addition, the outer protective tubes 1 and 2 for the electric wire according to the embodiment of the present invention are exemplified such that the peripheral movement restriction protrusions 40 are provided at four positions along the peripheral direction of the non-bendable straight tube portion 20. However, the peripheral movement restriction protrusions 40 are not limited thereto and at least one peripheral movement restriction protrusion 40 may be provided at at least one position on the non-bendable straight tube portion 20.

Furthermore, the outer protective tubes 1 and 2 for the electric wire according to the embodiment of the present invention are exemplified such that the longitudinal movement restriction protrusions 30 and the peripheral movement restriction protrusions 40 are provided on all of the non-bendable straight tube portions 20. However, the longitudinal movement restriction protrusions 30 and the peripheral movement restriction protrusions 40 are not limited thereto and may be provided on at least one section of the non-bendable straight tube portions 20. For example, the longitudinal movement restriction protrusions 30 and the peripheral movement restriction protrusions 40 may be provided on only the long section of the non-bendable straight tube portions 20 which particularly requires stiffness.

In addition, the technical scope of the present invention is not limited to the above-described embodiments. Various modifications, improvements, and the like of the above-described embodiments can be made without departing from the technical scope of the present invention.

Hereinafter, the outer protective tubes for an electric wire according to the embodiments will be summarized.

(1) The outer protective tube 1, 2 for an electric wire according to the embodiments is formed of an insulating resin in a tube shape so as to accommodate an electric wire W therein and is fixed to a predetermined mounting position by the fixing members 50. Along the longitudinal direction of the outer protective tube 1, 2 for the electric wire, the bendable portion 10 which is a bendable section and the non-bendable straight tube portions 20 each of which is a section held in a straight tube shape are alternately connected. A non-bendable straight tube portion of at least one section of the non-bendable straight tube portions 20 includes the plurality of longitudinal movement restriction protrusions 30 which are provided to protrude from the outer peripheral surface 20a of the non-bendable straight tube portion 20 along the peripheral direction of the non-bendable straight tube portion 20, and are provided along the longitudinal direction of the non-bendable straight tube portion 20 with the interval (T1) which is equal to the width of the fixing member 50 in the longitudinal direction of the non-bendable straight tube portion 20 so as to allow the fixing member 50 to be interposed between the longitudinal movement restriction protrusions 30. In addition, the non-bendable straight tube portion 20 further includes the peripheral movement restriction protrusion 40 which is provided to protrude from the outer peripheral surface 20a of the non-bendable straight tube portion 20 to linearly extend from one end to the other end of the non-bendable straight tube portion 20 along the longitudinal direction of the non-bendable straight tube portion 20 in order to restrict the movement of the fixing member 50 in the peripheral direction with respect to the non-bendable straight tube portion 20.

(2) In the outer protective tube 1, 2 for the electric wire according to the embodiments, in the non-bendable straight tube portion 20, at least a pair of longitudinal movement restriction protrusions 30 among the plurality of longitudinal movement restriction protrusions 30 are provided with the interval (T2) in which the fixing member 50 slidably moves in the longitudinal direction of the non-bendable straight tube portion 20.

(3) In the outer protective tube 1, 2 for the electric wire according to the embodiments, the peripheral movement restriction protrusions 40 are disposed at a plurality of positions along the peripheral direction so as to be evenly dispersed along the peripheral direction of the non-bendable straight tube portion 20.

The embodiments of the present invention are useful in providing the outer protective tube for the electric wire in which the stiffness of the non-bendable straight tube portion is uniformly increased in the peripheral direction and the longitudinal direction thereof and a fixing member can be easily fixed.

What is claimed is:

1. An outer protective tube for an electric wire which is formed of an insulating resin in a tube shape so as to accommodate an electric wire therein and is fixed to a predetermined mounting position by a fixing member, the outer protective tube comprising:
   a bendable portion which is a bendable section; and
   non-bendable straight tube portions each of which is a section held in a straight tube shape, wherein
   the non-bendable straight tube portions and the bendable portion are alternately connected along a longitudinal direction of the outer protective tube, and
   a non-bendable straight tube portion of at least one section of the non-bendable straight tube portions includes
      a plurality of longitudinal movement restriction protrusions which are provided to protrude from an outer peripheral surface of the non-bendable straight tube portion along a peripheral direction of the non-bendable straight tube portion, and are provided along a longitudinal direction of the non-bendable straight tube portion with an interval which is equal to a width of the fixing member in the longitudinal direction of the non-bendable straight tube portion so as to allow the fixing member to be interposed between the longitudinal movement restriction protrusions, and
      at least one peripheral movement restriction protrusion which is provided to protrude from the outer peripheral surface of the non-bendable straight tube portion to linearly extend from one end to the other end of the non-bendable straight tube portion along the longitudinal direction of the non-bendable straight tube portion in order to restrict movement of the fixing member in the peripheral direction with respect to the non-bendable straight tube portion.

2. The outer protective tube for the electric wire according to claim 1, wherein
   in the non-bendable straight tube portion, at least a pair of longitudinal movement restriction protrusions among the plurality of longitudinal movement restriction protrusions are provided with an interval in which the fixing member slidably moves in the longitudinal direction of the non-bendable straight tube portion.

3. The outer protective tube for the electric wire according to claim 1, wherein
   the at least one peripheral movement restriction protrusion comprises a plurality of peripheral movement restriction protrusions, and
   the plurality of peripheral movement restriction protrusions are disposed at a plurality of positions evenly dispersed along the peripheral direction of the non-bendable straight tube portion.

* * * * *